DIRECT-COUPLED NEGATIVE FEEDBACK AMPLIFIER
Filed March 23, 1962
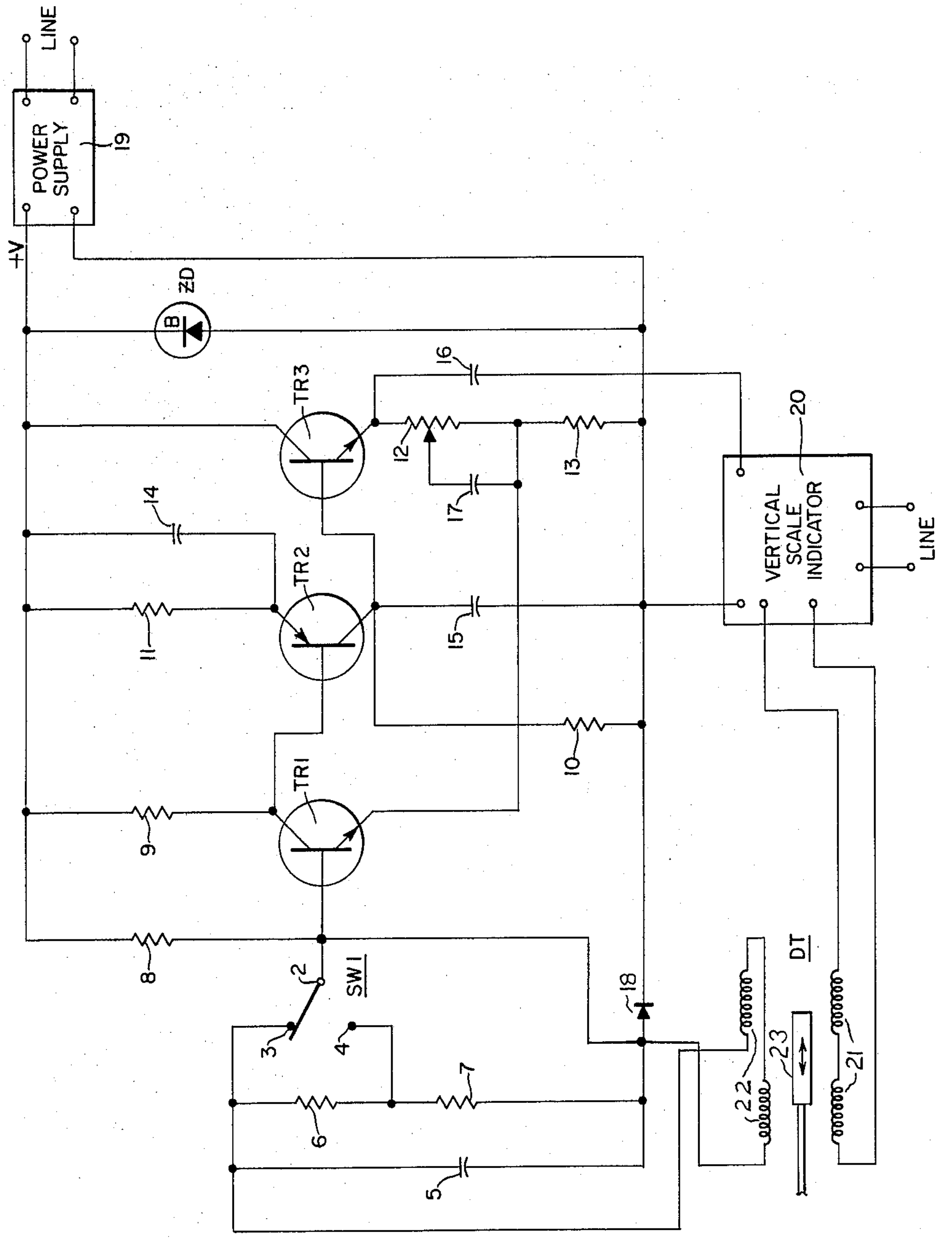
INVENTOR.
GROVER K. HOUPT
BY
Nelson E. Kimmelman
ATTORNEY United States Patent Office
3,221,262
Patented Nov. 30, 1965

3,221,262
DIRECT-COUPLED NEGATIVE FEEDBACK AMPLIFIER

Grover K. Houpt, Lansdale, Pa., assignor to Automatic Timing & Controls, Inc., King of Prussia, Pa., a corporation of Pennsylvania Filed Mar. 23, 1962, Ser. No. 181,965
5 Claims. (Cl. 330—17)

This invention relates to amplifiers and in particular to a solid-state amplifier having a plurality of sensitivity ranges which is useful in converting the electrical output of a transducer to drive a load such as an indicating device.

Transducers such as differential transformers convert motion to an electrical output indicative of the extent and direction of that motion. However, the output of the differential transformer for very small displacements of the armature thereof may not be large enough to provide a significant or easily readable reading on an associated indicator. While one could drive the primary windings of the transformer somewhat harder to increase the secondary winding output voltage, there is a limit to what may be done in this regard because the windings may overheat and too many harmonics may be produced in the signal across the output winding.

It may therefore be necessary to employ an auxiliary amplifier between the output of the differential transformer and the input to the indicator, even in cases where the indicator has some internal amplification of its own. In order not to load down the output of the differential transformer, it is desired that the input impedance of the auxiliary amplifier be high. Furthermore, if the indicator has a given scale length, it would be desirable to produce full scale, accurate deflection for a very small displacement say, .001 inch, of the armature of the differential transformer. Also, it is often desirable to provide means between the output of the differential transformer and the input of the indicator by which a 10:1 change of the effective sensitivity of the indicator, for example, may be obtained by merely throwing a switch.

Among the objects of the invention are:

(1) To provide an improved circuit that may be used to amplify the output signal of a transducer or other signal source before applying it to a utilization circuit.

(2) To provide an improved amplifier circuit which has a high input impedance and low output impedance.

(3) To provide a signal amplifier usable to increase the effective sensitivity of an associated indicating device.

(4) To provide an improved signal amplifying circuit for producing different ranges of amplified output voltages by actuation of simple switching means.

(5) To provide an improved amplifier circuit exhibiting long-term stability of its gain notwithstanding transistor aging and variations in other circuit and external parameters.

Still other objects of the invention will occur to those skilled in the art upon reading the specification and claims and upon perusing the sole figure herein.

The sole figure depicts in schematic form one form of my invention as embodied in a differential transformer-indicator system.

In accordance with my invention I provide a multistage amplifying device which includes a number of directly-coupled stages and also includes a negative A.C. feedback path which assists in providing high input impedance and low output impedance with stable gain characteristics. In one form, my invention includes three stages of directly-coupled transistor amplification in which there is no net inversion of the signal from input to output. An A.C. feedback path is provided between the output of the third transistor and one of the terminals of the firset transisor as will be explained below.

As shown in the sole figure, there is provided a condition-sensing device such as the differential transformer indicated generally by the letters DT which has primary windings 21 which are connected to terminals of a vertical scale indicator 20. The latter indicator may also have a differential transformer therein for establishing a desired zero point. The primary windings of the internal transformer may be in series with the windings 21, both of them being adapted to be energized by an appropriate source of alternating current, usually in the low audio range. The indicator 20 may also include one or more stages of amplification. A typical example of such an indicator is the Model 6105 produced and sold by Automatic Timing & Controls, Inc., of King of Prussia, Pennsylvania. The secondary windings 22 of the transformer DT are connected in series-bucking relation and one of their terminals is connected via resistances 6 and 7 to contacts 3 and 4 of switch SW1. The other terminal is connected to the junction of capacitor 5, resistance 7, one terminal of the diode 18, and to a bias resistance 8.

As the condition which is sensed by the transformer DT changes, the armature 23 thereof is moved axially and therefore the voltage induced in the windings 22 will vary in amplitude. The induced voltage will be applied via the switch SW1 to the base of the first stage TR1 of a three-stage direct-coupled transistor amplifier. The overall output of the three transistors is taken across the series combination of potentiometer 12 and resistance 13 via capacitor 16 and is applied to the input of the indicator 20.

The capacitor 5 appearing in the input to the first transistor, is provided for noise suppression. The two series resistors 6 and 7 are provided to enable the amplifier circuit to produce output voltages which may be varied by a ratio of 10:1, for example. If the value of the resistance 6 is 5000 ohms, and the value of resistance 7 is 555 ohms, for example, a corresponding difference in the input voltage in the ratio of about 10:1 may be obtained depending upon whether the arm 2 of the switch SW1 is touching the contact 3 or contact 4. In either case, the condition-representative signal is applied between the base and emitter of transistor TR1 which is shown as being an NPN transistor. The collector of TR1 is biased by a resistance 9 which, like resistance 8, is coupled to an appropriate positive D.C. voltage supplied by the power supply 19. The output of the transistor TR1 is applied directly from its collector to the base of a following transistor TR2 which is of the PNP type. The emitter of TR2 is biased by a voltage drop across the resistance 11 which is also connected to a positive voltage terminal of the power supply 19. A capacitor 14 is provided for by-pass purposes.

The collector of TR2 is connected directly to the base of the following NPN transistor TR3 and also, through a resistor 10, to the power supply 19 and to diode 18. The transistor TR3 has its collector also coupled to the positive D.C. terminal of the power supply 19. Its output is taken across the emitter resistance circuit which comprises a potentiometer 12 in series with a resistance 13. A capacitor 17 is connected between the slider of potentiometer 12 and the emitter of TR1. The potentiometer 12, in conjunction with the capacitor 17, provides a negative feedback path from TR3 to TR1. When the slider of the potentiometer 12 is in its top-most position it is directly connected to the emitter of TR3, and the signal which is fed back has essentially the same amplitude as the signal applied to the base of the first transistor TR1. As the slider moves downward, the negative feedback A.C. signal is attenuated so that the positive signal applied to the emitter of TR1 becomes less positive. Consequently, the transistor TR1 produces a larger output signal which eventually causes the input signal at TR2 and TR3 to increase until the feedback signal is approximately equal to the input signal to TR1. A similar action occurs when the signal applied to the base of TR3 decreases in strength.

The capacitor 17 is used as a bypass capacitor to prevent the A.C. feedback signal from affecting the D.C. bias applied to the emitter of TR3. The chief source of the bias for the emitter of TR3 is the resistance 13. The diode 18 is used to assist in biasing the base of TR1. The Zener diode ZD is shunted across the output of the power supply 19 to provide voltage regulation.

In addition to the A.C. feedback there is a D.C. feedback line generally through the same feedback circuit (with the exception of capacitor 17, of course) which assists in maintaining temperature stability of the circuit. The negative A.C. feedback circuit is useful in providing high input impedance so as not to load the condition-sensing differential transformer DT. The use of TR3 in the emitter-follower configuration and the negative feedback also cooperate to produce a low output impedance for the amplifier which is useful when it has to match a low input impedance of an associated utilization circuit.

In essence, what I have invented is an amplifier circuit which uses a plurality of amplifying stages in which there is no net inversion of the signal from the input to the output and which employs a negative feedback signal in a particular way. The transistor stages are direct-coupled to one another and the output emitter-follower is coupled to the emitter of the first amplifying stage. It should be appreciated however, that the same general principle could be applied to an amplifier having seven or nine (or other odd number if alternating transistor types are used) direct-coupled stages without departing from the essential spirit of this invention. By "alternating transistor types" or "alternate conductivity type" as used herein I mean that the successive transistors of the circuit can be either NPN, PNP, NPN, or PNP, NPN, and PNP. The NPN, PNP, NPN configuration was chosen for convenience in biasing the transistor stages and also because with this arrangement the power supply 19 can be used even if its output signal has more "ripple" than the output of a power supply that could be used with an alternative PNP, NPN, and PNP arrangement.

In the circuit illustrated the following values of the components were found to give highly satisfactory results:

| Component No.: | Value |
|---|---|
| 5 | 0.1 mfd. |
| 6 | 5000 ohms. |
| 7 | 555.5 ohms. |
| 8 | 15,000 ohms. |
| 9 | 1200 ohms. |
| 10 | 2700 ohms. |
| 11 | 1000 ohms. |
| 12 | 2000 ohms. |
| 13 | 220 ohms. |
| 14 | 300 mfd. |
| 15 | 0.22 mfd. |
| 16 | 500 mfd. |
| 17 | 500 mfd. |
| TR1 | 2N35. |
| TR2 | 2N270. |
| TR3 | 2N35. |

It should be appreciated that variations in the circuit illustrated may occur to those skilled in the art upon reading of the specification and inspection of the drawing herein which do not depart from the essence of this invention. Consequently, I desire my invention to be limited only by the following claims.

I claim:

1. An amplifier circuit comprising:
(a) an odd plurality of solid-state amplifying devices of alternating conductivity types directly coupled in series, each of said devices having emitter, collector and base electrodes,
(b) means coupled between the emitters of the final one of said devices and the first of said plurality of said devices for providing a negative A.C. feedback path, a portion of said last-named means also providing D.C. feedback between said emitters,
(c) means for applying an input signal to be amplified to the base of said first device, and
(d) means for developing an output signal at the emitter of the final one of said devices for application to a utilization device.

2. An amplifier circuit comprising:
(a) an odd plurality of alternate conductivity type transistors directly-coupled to one another, each of said transistors having an emitter, base and collector electrode,
(b) a negative-feedback A.C. current path between the emitter of the last of said transistors and the emitter of the first of said transistors, said path including means for varying the amplitude of said feedback current, a portion of said path also providing D.C. feedback from said last transistor to said first transistor,
(c) means for applying an input signal between the base and emitter of said first transistor, and
(d) means for developing an amplified output signal at the emitter of said last transistor.

3. The amplifier circuit according to claim 2:
wherein the means in (b) for varying the amplitude of the feedback current includes a potentiometer whose fixed resistance portion is connected between said emitters of said first and last transistors and also includes a capacitor connected to the slider of said potentiometer and to said emitter of said first transistor, and
wherein (c) includes a voltage divider circuit for applying selected amplitude portions of said input signals between the base and emitter of said first transistor.

4. An A.C. amplifier circuit comprising:
(a) an odd number of direct-coupled transistors of alternating conductivity types, each of said transistors having an emitter, base and collector electrode,
(b) a negative feedback path between the emitter of the last transistor and the emitter of the first transistor, said path providing both A.C. and D.C. feedback, said path including:
  (i) a potentiometer whose fixed resistance is connected between the emitter of said last transistor and the emitter of said first transistor and also including
  (ii) a capacitor coupled to the slider of said potentiometer and to the emitter of said first transistor,
(c) means for applying an input A.C. signal between the base and emitter of said first transistor, and
(d) means for deriving a single-ended amplified A.C. output signal as a function of the A.C. current in the emitter-base circuit of said last transistor, said last-named means including a resistor connected in series with the fixed resistance of said potentiometer, said derivinig means developing said output signals across the series combination of said potentiometer and said resistor.

5. The A.C. amplifier according to claim 4:
wherein said odd number is three,
wherein said (c) means is single-ended and of high-impedance, and wherein adjustment of the position of said slider changes substantially only the gain of the A.C. signal in said amplifier and does not appreciably affect the D.C. levels therein.

References Cited by the Examiner

UNITED STATES PATENTS

| | | | |
|---|---|---|---|
| 3,030,586 | 4/1962 | Paz et al. | 330—19 |
| 3,042,876 | 7/1962 | Pegram | 330—28 X |
| 3,099,802 | 7/1963 | Mattern | 330—19 X |

OTHER REFERENCES

Steele: "Low-Noise Transistor Preamp," Electronics World, February 1960, pages 57–59.

Goedjen: Raytheon Semiconductor Engineering File No. 127T, page 11, September 1959.

NATHAN KAUFMAN, *Acting Primary Examiner.*

JOHN KOMINSKI, ROY LAKE, *Examiners.*

S. H. GRIMM, *Assistant Examiner.*